G. HALINKA.
ANIMAL TRAP.
APPLICATION FILED NOV. 29, 1910.
1,001,639.
Patented Aug. 29, 1911.
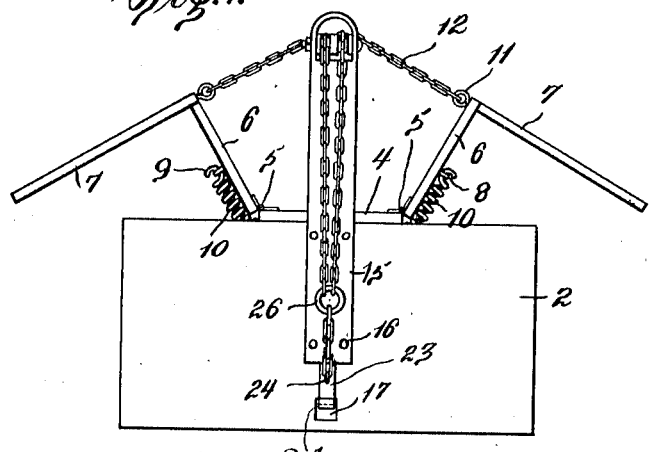
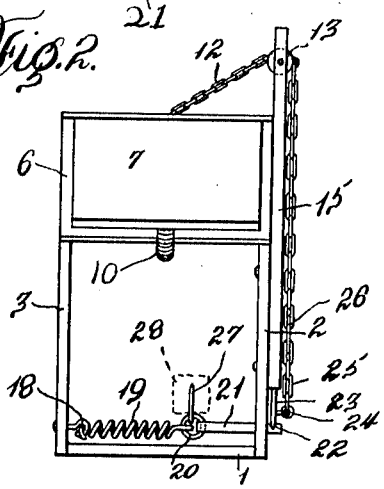
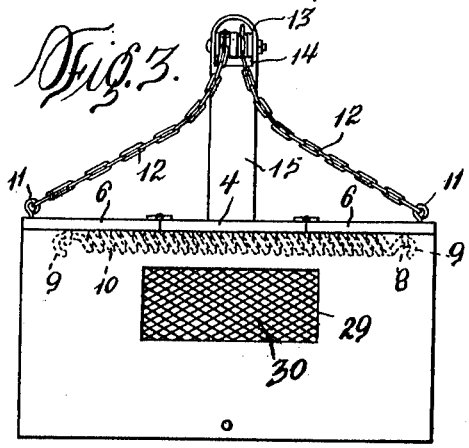
WITNESSES
INVENTOR
G. Halinka

UNITED STATES PATENT OFFICE.

GEORGE HALINKA, OF ALLIANCE, OHIO.

ANIMAL-TRAP.

1,001,639.  Specification of Letters Patent. Patented Aug. 29, 1911.

Application filed November 29, 1910. Serial No. 594,661.

*To all whom it may concern:*

Be it known that I, GEORGE HALINKA, a subject of the King of Hungary, residing at Alliance, in the county of Stark and State of Ohio, have invented certain new and useful Improvements in Animal-Traps, of which the following is a specification, reference being had therein to the accompanying drawing.

This invention relates to animal traps, and more particularly to a trap for catching rats and mice through the medium of a suitable bait located in the trap.

The object of my invention is to provide a trap that can be easily and safely set to positively entrap an animal that enters the trap.

Another object of the invention is to provide a trap with flap doors and novel means for quickly closing the doors when an animal enters the trap.

A further object of the invention is to accomplish the above results by a structure that is simple, durable, and efficient for entrapping various kinds of animals.

These and such other objects as may hereinafter appear are attained by the novel construction, combination and arrangement of parts to be hereinafter specifically described and then claimed.

Reference will now be had to the drawing forming a part of this specification, wherein there is illustrated a preferred embodiment of the invention, but it is to be understood that the structural elements thereof can be varied or changed without departing from the spirit and scope of the invention.

In the drawing:—Figure 1 is a side elevation of the trap in an open position, Fig. 2 is an end view of the same, and Fig. 3 is a side elevation of the trap in a closed position.

A trap in accordance with this invention comprises a base plate 1, side walls 2 and 3 and a central top plate 4, said top plate being approximately one-third the length of the walls 2 and 3, and connected to the transverse edges of said top plate by hinges 5 or other means are flap doors, comprising top plates 6 and end walls 7, the end walls 7 being arranged at right angles to the top plates 6, whereby when the plates 6 are in a closed position upon the upper edges of the walls 2 and 3, the end walls 7 will fit between the side walls 2 and 3 and engage the bottom plate 1, thereby providing a box like structure which forms a compartment for the animal to be entrapped by the closing of the flap doors. The inner sides of the top plates 6 are provided with staples 8 and connected to said staples are the hook-shaped ends 9 of a coiled retractile spring 10 that extends into the trap and under the central top plate 4, the tension of this spring normally retaining the flap doors in a closed position. The outer and upper edges of the top plates 6 are provided with eyes 11 and connected to said eyes are chains or cables 12, these chains or cables extending upwardly over a double sheave 13 revolubly mounted in an opening 14 provided therefor in the upper end of a standard 15 connected to the side wall 2, as at 16. The lower end of the standard 15 terminates above an opening 17 formed in the side wall 2 adjacent to the base plate 1.

The inner side of the wall 3 adjacent to the base plate 1 is provided with an eye 18 and connected to said eye is one end of a retractile spring 19, the opposite end of said spring being connected to a ring 20, and said ring is loosely connected to a bar 21 adapted to extend through the opening 17. The upper side of the bar 21 adjacent to the outer end thereof is provided with a transverse groove 22 V-shaped in cross section and adapted to engage the tapered lower end of a block 23, said block having the outer side thereof provided with an eye 24 to which is attached a chain 25 having the upper end thereof connected by a link 26 to the ends of the chains or cables 12. The ring 20 is provided with a pin 27 and upon this pin can be placed a bait 28.

The side wall 3 has an opening 29 in which is located a screen 30, preferably made of wire mesh.

To set the trap, the flap doors are opened by pulling downwardly upon the chains or cables 12. After a piece of bait has been placed upon the pin 27, the bar 21 is raised in the opening 17 and moved into engagement with the lower end of the block 23, the upper end of the block being held against the lower end of the standard 15. When an animal, as a rat attempts to remove the bait 28, the bar 21 is immediately moved out of engagement with the block 23 and the tension of the spring 10 is sufficient to rapidly close the flap doors, thus entrapping the animal and preventing its escape. One way of killing the animal within the trap is to immerse the entire trap in water, whereby the water entering the opening 29 will drown the animal.

To determine whether an animal has been entrapped it is only necessary to move the trap until the animal appears at the screen 30.

The trap can be made of light and durable metal and of various sizes.

What I claim is:—

A trap comprising a receptacle having both of its ends open and further having a portion of its top open, a plate disposed centrally of and secured to said top and of a width less than the length of the top, spring-controlled angle-shaped doors hinged to said top plate and each having its upper arm of a length equal to the width of the top of the receptacle and its lower arm of a width less than the width of the receptacle, said doors adapted to close the top and ends of the receptacle, the lower arms of said doors extending between the ends of the side walls and engaging the bottom of the receptacle when the doors are moved to close the receptacle, a standard secured to the outer face of and projecting above one of the side walls, the lower end of said standard positioned above the bottom of said receptacle, a sheave revolubly-mounted in the upper end of said standard, chains attached to said doors and extending over and depending from said sheave, that side wall to which said standard is secured provided with an opening positioned below the lower end of the standard, a block carried by said chains and adapted to abut against the lower end of the standard for maintaining the doors in open position, a spring-controlled bar positioned within the trap and extending through said opening and engaging said block for maintaining it against the standard, and means whereby the bar may be released from engagement with said block thereby permitting the doors to automatically move to closed position.

In testimony whereof I affix my signature in the presence of two witnesses.

GEORGE HALINKA.

Witnesses:
MAX H. SROLOVITZ,
CHRISTINA T. HOOD.

Copies of this patent may be obtained for five cents each, by addressing the "Commissioner of Patents, Washington, D. C."